(12) United States Patent
Cushman

(10) Patent No.: US 7,233,576 B1
(45) Date of Patent: Jun. 19, 2007

(54) METHOD AND APPARATUS FOR TRANSFERRING DATA FROM AN ATM CONNECTION TABLE TO MEMORY FOR USE BY AN APPLICATION PROGRAM

(75) Inventor: Paul W. Cushman, Montclair, NJ (US)

(73) Assignee: Network General Technology, George Town, Grand Cayman (KY)

( * ) Notice: Subject to any disclaimer, the term of this patent is extended or adjusted under 35 U.S.C. 154(b) by 1015 days.

(21) Appl. No.: 09/972,605

(22) Filed: Oct. 5, 2001

Related U.S. Application Data

(60) Provisional application No. 60/313,039, filed on Aug. 16, 2001.

(51) Int. Cl.
*G01R 31/08* (2006.01)
(52) U.S. Cl. .................. 370/248; 370/250; 370/252
(58) Field of Classification Search ............... 370/351, 370/389, 392, 395.1, 395.3, 395.31, 395.41, 370/395.6
See application file for complete search history.

(56) References Cited

U.S. PATENT DOCUMENTS

| | | | |
|---|---|---|---|
| 5,202,885 A | 4/1993 | Schrodi et al. ............ 370/94.1 |
| 5,414,707 A | 5/1995 | Johnston et al. | |
| 5,884,297 A | 3/1999 | Noven .......................... 707/1 |
| 5,898,688 A | 4/1999 | Norton et al. ............... 370/362 |
| 5,914,956 A * | 6/1999 | Williams ................ 370/395.41 |
| 6,061,820 A | 5/2000 | Nakakita et al. | |
| 6,148,410 A | 11/2000 | Baskey et al. .................. 714/4 |
| 6,195,352 B1 * | 2/2001 | Cushman et al. ......... 370/395.6 |
| 6,345,037 B2 | 2/2002 | St-Denis et al. | |
| 6,625,171 B1 * | 9/2003 | Matsudo ..................... 370/470 |

FOREIGN PATENT DOCUMENTS

WO    WO 00/14994    3/2000

OTHER PUBLICATIONS

Dravida, S. et al., "Error Detection and Correction Options for Data Services in B-ISDN," IEEE Journal on Selected Areas in Communications, Dec. 1991, pp. 1484-1495, vol. 9, No. 9.

Tan, C. et al., "Effects of Cell Loss on the Quality of Service for MPEG Video in ATM Environment," IEEE, Jul. 1995, pp. 11-15.

* cited by examiner

*Primary Examiner*—Phirin Sam
(74) *Attorney, Agent, or Firm*—Fenwick & West LLP

(57) ABSTRACT

A system, method and computer program product are provided for copying data from an asynchronous transfer mode (ATM) connection table. In use, an ATM connection table on an ATM network is monitored. During such monitoring, it is determined whether entries of the ATM connection table are active. If the entries are active, associated data is periodically transferred from the active entries of the ATM connection table to memory. Identifiers associated with the data are utilized for identification purposes. The transferred data in the memory may then be subsequently utilized with an application program.

49 Claims, 4 Drawing Sheets

METHOD AND APPARATUS FOR TRANSFERRING DATA FROM AN ATM CONNECTION TABLE TO MEMORY FOR USE BY AN APPLICATION PROGRAM

RELATED APPLICATION(S)

The present application claims priority from a provisional patent application filed Aug. 16, 2001 under Ser. No. 60/313,039, which is incorporated herein by reference.

FIELD OF THE INVENTION

The present invention relates to network analysis systems, and more particularly to monitoring a network for analysis purposes.

BACKGROUND OF THE INVENTION

With the advent of the Internet, there has been a sharp increase in the demand for network bandwidth which has been principally driven by two trends: (i) the increasing number of networked computers exchanging data; and (ii) the increasing need for networked computers to exchange ever-increasing quantities of data. In response to this demand, a variety of new computer network technologies have been developed that improve upon existing technologies by increasing the efficiency of data transmission, increasing the speed of data transmission, or both. Although such technologies achieve increased network bandwidth, they also create a need for new and improved technologies to analyze networks incorporating these technologies.

Network assessment tools referred to as "analyzers" are often relied upon to analyze networks during use. One example of such analyzers is the SNIFFER ANALYZER™ device manufactured by NETWORK ASSOCIATES, INC™. All analyzers have similar objectives such as determining why network performance is slow, understanding the specifics about excessive traffic, and/or gaining visibility into various parts of the network.

Analyzers are often used to monitor networks which are based on an asynchronous transfer mode (ATM) switching protocol. ATM switching is used in communications systems for switching voice, data, and video information. Frequently, these services are supported simultaneously by the same switch. In use, ATM switches are capable of switching small elements of information, called cells, rapidly between an input port and an output port. A header at the beginning of each cell contains identifying information that may also be modified in the course of this switching. During operation, the switches typically track the switching using connection tables, stored in a specialized memory in the switch.

In the prior art, each connection supported by the switch occupies at least one entry in one or more of the connection tables. Typical analyzer tools extract these entries for gathering statistics and monitoring various network parameters. To date, such entries have been extracted one-at-a-time. In other words, typically analyzers issue one call command to extract one entry from the connection table. This one-to-one relation thus results in a vast number of calls being made to extract the necessary data.

Since typical scanning is carried out in real-time, it is often difficult to extract all of the required information in a manner efficient enough to keep up with the operation of the switch. Often, the analyzer must take incomplete "snap shots" of the contents of the connection tables. This, in turn, results in incomplete statistics and substandard scanning results.

There is thus a need for an apparatus and method for more efficiently and effectively collecting information from ATM connection tables for analysis purposes.

DISCLOSURE OF THE INVENTION

A system, method and computer program product are provided for copying data from an asynchronous transfer mode (ATM) connection table. In use, an ATM connection table on an ATM network is monitored. During such monitoring, it is determined whether entries of the ATM connection table are active. If the entries are active, associated data is periodically transferred from the active entries of the ATM connection table to memory. Identifiers associated with the data are utilized for identification purposes. The transferred data in the memory may then be subsequently utilized with an application program.

In one embodiment, the data may be transferred from the active entries of a plurality of ATM connection tables. Such plurality of ATM connection tables may include one ATM connection table for each of a plurality of ATM links. As an option, the plurality of ATM connection tables may include at least one common ATM connection table.

In another embodiment, the entries of the ATM connection table may be deemed active if the entries have been just created since a previous transfer of data. Further, the entries of the ATM connection table may be deemed active if the entries have been altered since a previous transfer of data. As an option, the data from the active entries of the ATM connection table may include statistical information and/or state information.

In still another embodiment, a period with which the data is periodically transferred from the active entries of the ATM connection table to the memory may be configurable. Moreover, the period may be configurable within a predetermined range. Optionally, the predetermined range may be between 1 transfer/second to 4 transfers/second.

As an option, the periodic transfer of the data may be initiated utilizing an application program interface between the application program and the memory. The periodic transfer of the data may also be ceased utilizing the application program interface between the application program and the memory. Such application program interface may be capable of identifying a location in the memory to which the data is to be transferred. Further, the application program interface may identify a period at which the data is to be transferred to the memory. Still yet, the data from each entry of the ATM connection table may be transferred independently.

In still yet another embodiment, the memory may be interrupted in order for the application program to use the transferred data. Optionally, multiple instances of the data may be stored in the memory. Moreover, the memory may store the data in a circular manner.

It should be noted that the aforementioned identifiers may include ATM connection identifiers. During use, such identifiers may be translated per the desires of the user. In use, an age of the data may be tracked so that the data may be deleted upon the age reaching a predetermined amount.

DESCRIPTION OF THE PREFERRED EMBODIMENTS

Figure 1:
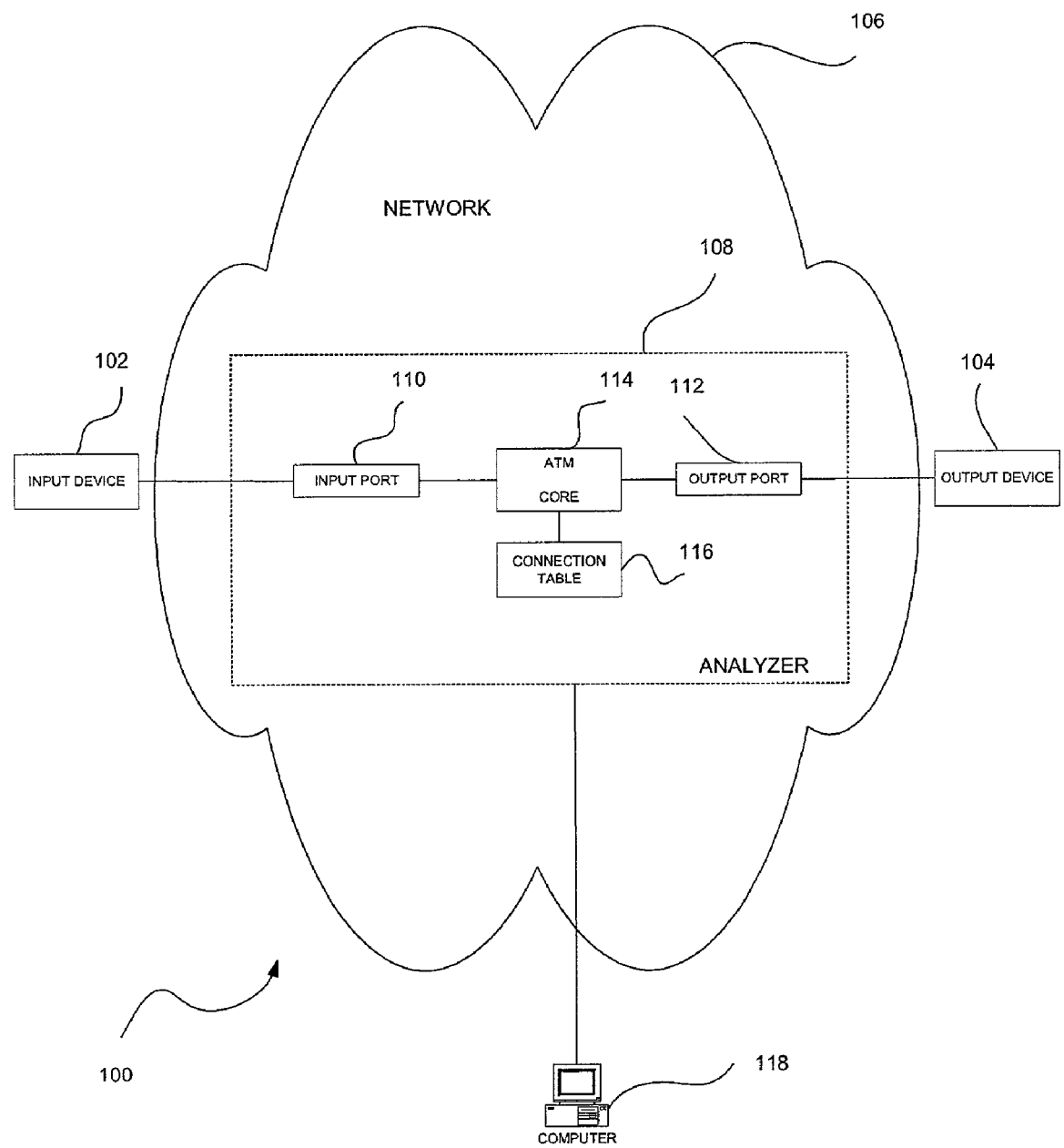
FIG. 1 is a schematic diagram of a network architecture, in accordance with one embodiment.

FIG. 1 illustrates an exemplary architecture 100, in accordance with one embodiment. As shown, at least one input device 102 is provided along with at least one output device 104. In the context of the present description, the input device 102 and the output device 104 may be any networked device that is capable of receiving and sending communications, respectively. For example, the input and output devices may include a desktop computer, lap-top computer, hand-held computer, printer or any other type of logic.

Each input device 102 and output device 104 of the present architecture 100 is coupled by way of a network 106. In the context of the present architecture 100, the network 106 may take any form including, but not limited to a local area network (LAN), a wide area network (WAN) such as the Internet, etc.

As shown in FIG. 1, coupled to the network 106 is an analyzer 108. Such analyzer may be coupled to a gateway, switch, input device 102, output device 104, or any other networked device or logic. In an embodiment where the analyzer 108 is coupled to an Internet switch, the switch may be an Asynchronous Transfer Mode (ATM) switch, a Frame Relay switch or any other switch that acts on units of user data usually called data cells.

As is well known, each cell has an identifying section such as a header, used for routing or identifying purposes. The data cells can represent actual data as from a computer, voice, video, or any other type of information. The present embodiment is described in terms of an ATM switch. However, the same technology can be applied to other types of switches as well.

As shown, the analyzer 108 includes at least one input port 110 and an output port 112 coupled to the input device 102 and the output device 104, respectively. An ATM core 114 is coupled between the input port 110 and the output port 112. In use, each input port 110 interfaces and connects to one or more of the input devices 102 for passing fully formed ATM cells to the ATM core 114. The output port 112 accepts fully formed cells and emits them to one or more of the output devices 104. It should be noted that the ATM core 114 may emit cells to a plurality of output ports represented by output port 112, and may send a plurality of copies of the cell to a single output port 112, each with a different header.

The ATM core 114 includes a certain number of connection slots to be configured for connecting the input ports represented by input port 110 and the output ports represented by the output port 112, or to be idle. Also included is a connection table 116 coupled to the ATM core 114 for tracking each connection supported by the ATM core 114 in a plurality of entries.

It should be noted that the analyzer 108 may be separate from or integral with the aforementioned components. In one embodiment, the analyzer 108 may be a standalone device which monitors the traffic/segment between two ATM switches [Network to Network Interface (NNI)] or between an ATM end-station and a switch [User to Network Interface (UNI)].

A computer 118 may be coupled to the analyzer 108 or constitute a component of the analyzer 108 for extracting such entries from the connection table 116 for gathering statistics and monitoring various network parameters. Such statistics and network parameters may then be used to troubleshoot, monitor network performance, and/or enhance security provisions, i.e. detect attacks, vulnerabilities, malicious code, etc.

Unlike prior art analyzers, the present embodiment extracts the entries from the connection table 116 by copying multiple entries into memory. This allows a more comprehensive collection of statistics with respect to the prior art method of extracting entries one-at-a-time.

Figure 2:
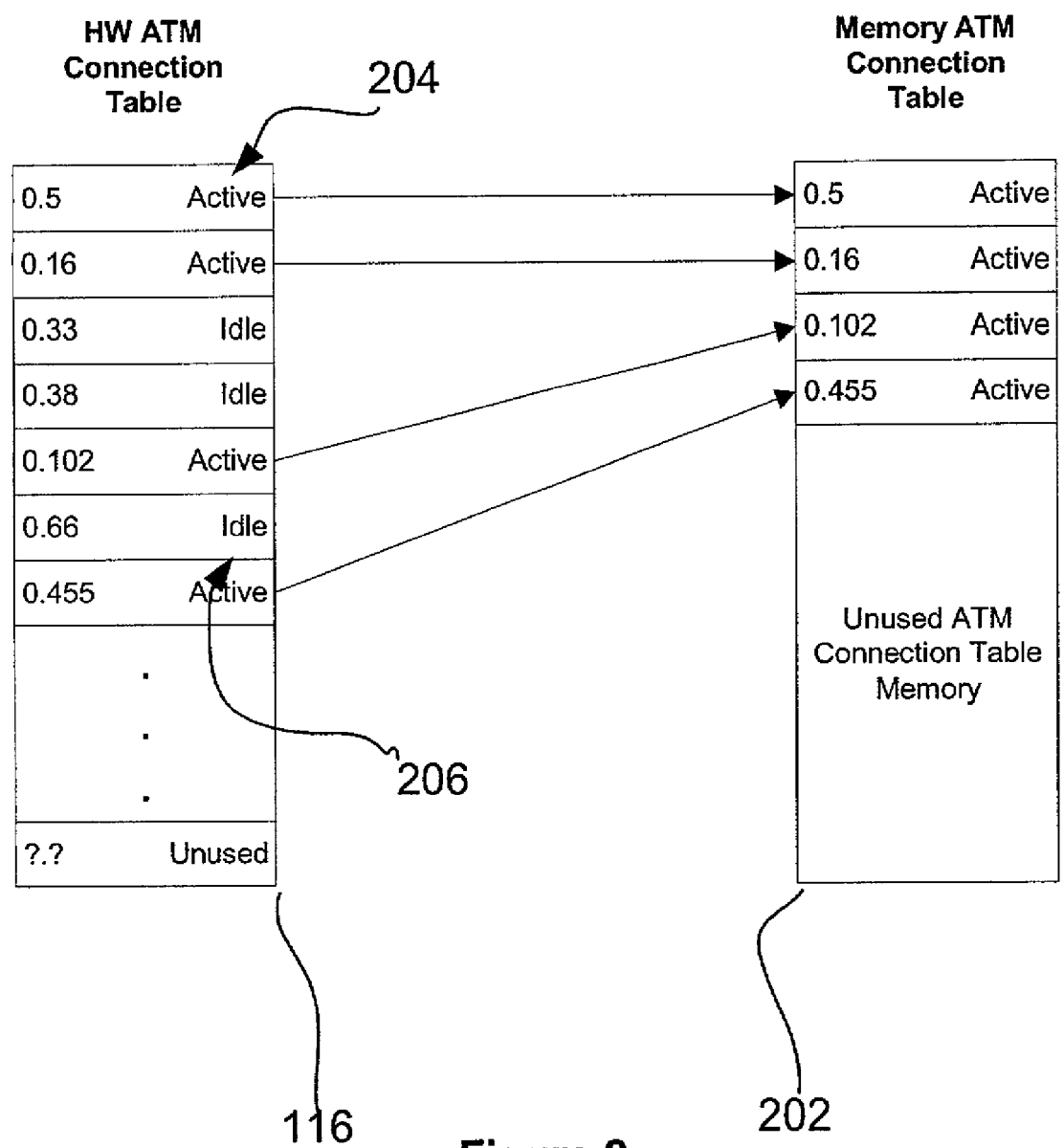
FIG. 2 illustrates the transfer of the entries between the connection table and analyzer memory, in accordance with one embodiment.

FIG. 2 illustrates the transfer of the entries between the connection table 116 and analyzer memory 202, in accordance with one embodiment. It should be noted that the analyzer memory 202 may be a component of the computer 118 of FIG. 1, dedicated memory, or any other desired memory located in any desired location. In use, the data stored in the ATM connection table may include statistical information, state information, protocol information, or any other data capable of being used to enhance the operation and security of the architecture 100. In one embodiment, the analyzer memory 202 may include at least 4 Kbytes.

As shown in FIG. 2, the connection table 116 includes a plurality of active entries 204 and a plurality of idle entries 206. In one embodiment, the entries of the connection table 116 may be deemed active if the entries have been just created since a previous transfer of data. Further, the entries of the connection table 116 may be deemed active if the entries have been altered since a previous transfer of data. Still yet, a portion of the connection table 116 may be left unused.

It should be noted that a plurality of such connection tables 116 may be provided. In such embodiment, one ATM connection table may be provided for each of a plurality of ATM links. Further, the plurality of ATM connection tables may include at least one common ATM connection table.

Figure 3:
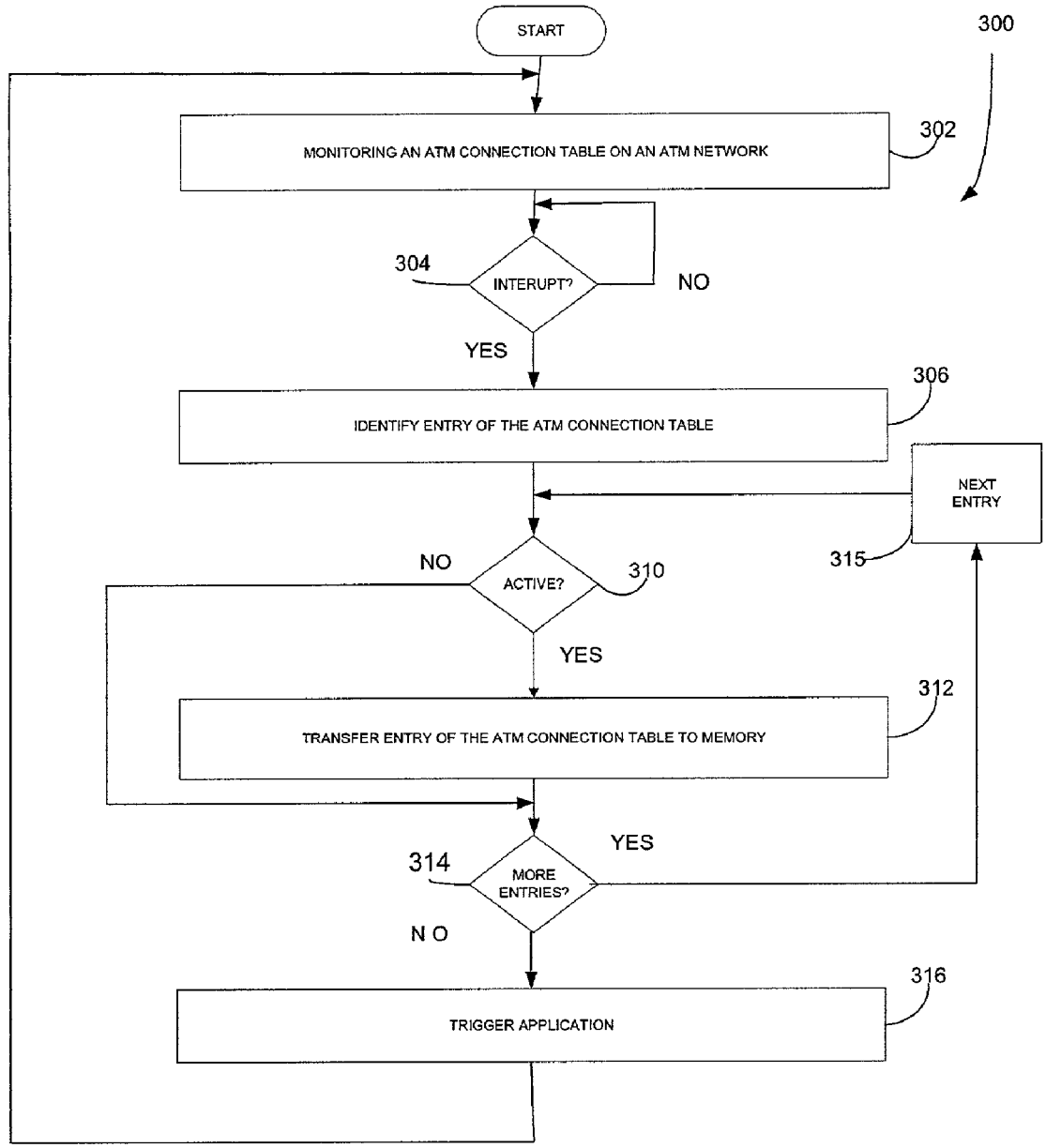
FIG. 3 shows a method for copying data from the connection table such as the ATM connection table shown in FIGS. 1 and 2.

FIG. 3 illustrates a method 300 for copying data from a connection table such as the ATM connection table shown in FIGS. 1 and 2. In operation 302, the ATM connection table is monitored. Upon a triggering event, the entries in the ATM connection table are copied over into memory. In one embodiment, the triggering event may be a periodic interrupt signal generated by the analyzer. It should be noted, however, that the triggering event may be produced by any desired logic that determines when it is appropriate for the entries in the ATM connection table to be copied over into memory.

In one embodiment, a period with which the interrupt signal is generated may be configurable. Moreover, the period may be configurable within a predetermined range. Optionally, the predetermined range may be between 1 transfer/second to 4 transfers/second. This range may ensure optimal transfer of data to enable a comprehensive statistical analysis by the analyzer.

Once it is determined in decision 304 that the interrupt is received, the various entries of the ATM connection table are identified. Note operation 306. The purpose of such identification process may be to identify which entries of the ATM connection table are suitable for transfer to the memory. In particular, it is determined in decision 310 whether the identified entries are active. As mentioned earlier, the entries of the connection table may be deemed active if the entries have been just created since a previous transfer of data, the entries have been altered since a previous transfer of data, or the entries are in any other way ready to be transferred.

If the entries are deemed active in decision 310, data is transferred from such entries of the ATM connection table to memory. See operation 312. Next, in decision 314, it is determined whether any additional entries exist. If so, a next entry of the ATM connection table is identified in operation 315, and operation 312 is repeated for any additional active entries. Optionally, multiple instances of the data of each entry may be stored in the memory, if the resources of the memory are sufficient. While an independent transfer of entries is set forth hereinabove, it should be understood that contiguous entries may be transferred at once if supported by the accompanying hardware.

Moreover, the memory may store the data in a circular manner. In other words, the data may be transferred from the ATM connection table to the entries in the memory in sequential order from a first entry to a last entry in the memory. Once the last entry in the memory is filled, the process may be repeated at the first entry.

As mentioned earlier, the data may be transferred from the active entries of a plurality of ATM connection tables, where each ATM connection table corresponds to one of a plurality of ATM links. Further, the plurality of ATM connection tables may include at least one common ATM connection table from which entries are extracted.

Once it is has been determined in decision 314 that no further additional entries exist, an application program associated with the analyzer may be prompted to use the entries transferred to the memory. See operation 316. So that the application program may use the entries transferred to the memory, identifiers associated with the data may be utilized for identification purposes. It should be noted that such identifiers may include ATM connection identifiers. As an option, such identifiers may be translated into a "CAM ID" which is traditionally used by the ATM core.

As an option, the periodic transfer of the data may be initiated utilizing an application program interface between the application program and the memory. The periodic transfer of the data may also be ceased utilizing the application program interface. Such application program interface may be further capable of identifying a location in the memory to which the entry data is to be transferred. Further, the application program interface may identify a period at which the data is to be transferred to the memory.

By periodically initiating the transfer of all active entries to memory, a more complete set of data is collected for use by the analyzer when monitoring an associated architecture. Further, by storing the entries in the memory, the application program is given adequate time to adequately analyze the entry data. As an option, the memory transfer method 300 may be interrupted in order to further ensure that the application program has adequate time to use the transferred data.

Figure 4:
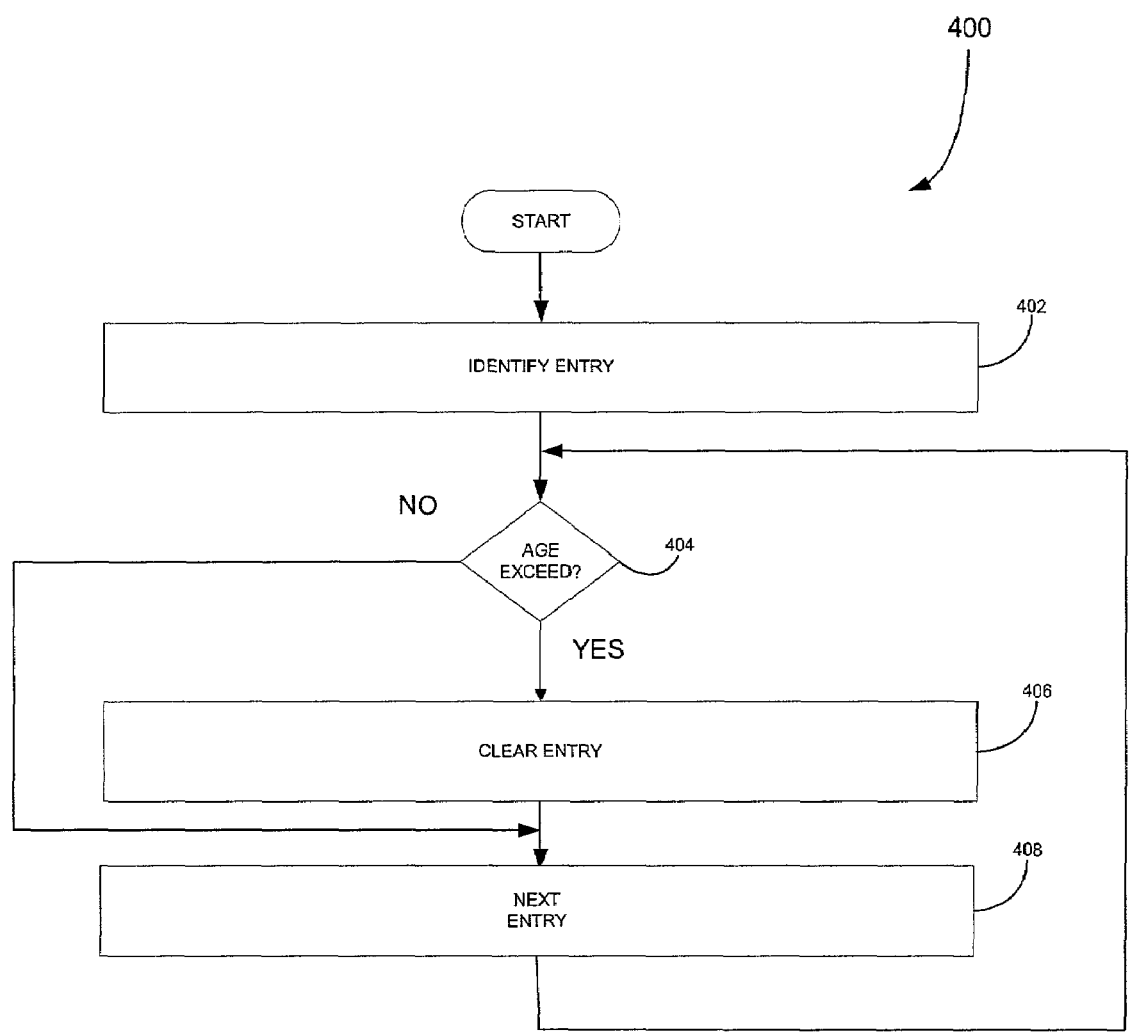
FIG. 4 illustrates a method that is executed in parallel with the method of FIG. 3 for clearing the entries that have been transferred to the memory.

FIG. 4 illustrates a method 400 that is executed in parallel with the method 300 of FIG. 3 for clearing the entries that have been transferred to the memory. It should be noted that the method 400 may be continuously executed while the method 300 of FIG. 3 is being used to extract entries from the connection table.

As shown, one of the entries is identified in operation 402 after which it is determined in decision 404 whether the age thereof has exceeded a predetermined amount. Such predetermined age may be selected based on when the usefulness of an entry is conventionally depleted. If such age has been exceeded, the entry may be cleared in operation 406.

After the entry is cleared or it is determined in decision 404 that the age of the present entry has not exceeded the predetermined amount, a next entry is identified. Note operation 408. By this design, the entries may be sequentially checked to determine whether the age has exceeded the threshold, and deleted accordingly in order to make room for additional incoming transferred data.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for copying data from an asynchronous transfer mode (ATM) connection table, comprising:
   (a) monitoring an ATM connection table on an ATM network;
   (b) determining whether entries of the ATM connection table are active, the entries of the ATM connection table being active if the entries have been altered or just created since a previous transfer of data;
   (c) periodically transferring data from active entries of the ATM connection table to memory;
   (d) utilizing identifiers associated with the data for identification purposes; and
   (e) utilizing the transferred data in the memory with an application program.

2. The method as recited in claim 1, wherein the data is transferred from the active entries of a plurality of ATM connection tables.

3. The method as recited in claim 2, wherein the plurality of ATM connection tables include one ATM connection table for each of a plurality of ATM links.

4. The method as recited in claim 3, wherein the memory includes 4 Kbtyes of memory.

5. The method as recited in claim 2, wherein the plurality of ATM connection tables include at least one common ATM connection table.

6. The method as recited in claim 1, wherein the data from the active entries of the ATM connection table includes statistical information.

7. The method as recited in claim 1, wherein the data from the active entries of the ATM connection table includes state information.

8. The method as recited in claim 1, wherein a period with which the data is periodically transferred from the active entries of the ATM connection table to the memory is configurable.

9. The method as recited in claim 8, wherein the period is configurable within a predetermined range.

10. The method as recited in claim 9, wherein the predetermined range is between 1 transfer/second to 4 transfers/second.

11. The method as recited in claim 1, and further comprising initializing the periodic transfer of the data utilizing an application program interface between the application program and the memory.

12. The method as recited in claim 1, and further comprising ceasing the periodic transfer of the data utilizing an application program interface between the application program and the memory.

13. The method as recited in claim 11, wherein the application program interface identifies a location in the memory to which the data is to be transferred.

14. The method as recited in claim 11, wherein the application program interface identifies a period at which the data is to be transferred to the memory.

15. The method as recited in claim 1, wherein the data from each entry of the ATM connection table is transferred independently.

16. The method as recited in claim 1, wherein the memory is interrupted in order for the application program to use the transferred data.

17. The method as recited in claim 1, wherein multiple instances of the data are stored in the memory.

18. The method as recited in claim 1, wherein the memory stores the data in a circular manner.

19. The method as recited in claim 1, and further comprising identifying a last entry of the ATM connection table.

20. The method as recited in claim 1, wherein the identifiers are ATM connection identifiers.

21. The method as recited in claim 20, and further comprising translating the identifiers.

22. The method as recited in claim 1, and further comprising determining an age of the data.

23. The method as recited in claim 22, wherein the data is deleted upon the age reaching a predetermined amount.

24. A computer program product stored in a computer readable medium for copying data from an asynchronous transfer mode (ATM) connection table, comprising:
    (a) computer code for monitoring an ATM connection table on an ATM network;
    (b) computer code for determining whether entries of the ATM connection table are active, the entries of the ATM connection table being active if the entries have been altered or just created since a previous transfer of data;
    (c) computer code for periodically transferring data from active entries of the ATM connection table to memory;
    (d) computer code for utilizing identifiers associated with the data for identification purposes; and
    (e) computer code for utilizing the transferred data in the memory with an application program.

25. The computer program product as recited in claim 24, wherein the data is transferred from the active entries of a plurality of ATM connection tables.

26. The computer program product as recited in claim 25, wherein the plurality of ATM connection tables include one ATM connection table for each of a plurality of ATM links.

27. The computer program product as recited in claim 26, wherein the memory includes at least 4 Kbtyes of memory.

28. The computer program product as recited in claim 25, wherein the plurality of ATM connection tables include at least one common ATM connection table.

29. The computer program product as recited in claim 24, wherein the data from the active entries of the ATM connection table includes statistical information.

30. The computer program product as recited in claim 24, wherein the data from the active entries of the ATM connection table includes state information.

31. The computer program product as recited in claim 24, wherein a period with which the data is periodically transferred from the active entries of the ATM connection table to the memory is configurable.

32. The computer program product as recited in claim 31, wherein the period is configurable within a predetermined range.

33. The computer program product as recited in claim 32, wherein the predetermined range is between 1 transfer/second to 4 transfers/second.

34. The computer program product as recited in claim 24, and further comprising initializing the periodic transfer of the data utilizing an application program interface between the application program and the memory.

35. The computer program product as recited in claim 24, and further comprising ceasing the periodic transfer of the data utilizing an application program interface between the application program and the memory.

36. The computer program product as recited in claim 35, wherein the application program interface identifies a location in the memory to which the data is to be transferred.

37. The computer program product as recited in claim 36, wherein the application program interface identifies a period at which the data is to be transferred to the memory.

38. The computer program product as recited in claim 24, wherein the data from each entry of the ATM connection table is transferred independently.

39. The computer program product as recited in claim 24, wherein the memory is interrupted in order for the application program to use the transferred data.

40. The computer program product as recited in claim 24, wherein multiple instances of the data are stored in the memory.

41. The computer program product as recited in claim 24, wherein the memory stores the data in a circular manner.

42. The computer program product as recited in claim 24, and further comprising identifying a last entry of the ATM connection table.

43. The computer program product as recited in claim 24, wherein the identifiers are ATM connection identifiers.

44. The computer program product as recited in claim 43, and further comprising translating the identifiers.

45. The computer program product as recited in claim 24, and further comprising determining an age of the data.

46. The computer program product as recited in claim 45, wherein the data is deleted upon the age reaching a predetermined amount.

47. A system for copying data from an asynchronous transfer mode (ATM) connection table, comprising:
    (a) logic for monitoring an ATM connection table on an ATM network;
    (b) logic for determining whether entries of the ATM connection table are active, the entries of the ATM connection table being active if the entries have been altered or just created since a previous transfer of data;
    (c) logic for periodically transferring data from active entries of the ATM connection table to memory; and
    (d) logic for utilizing identifiers associated with the data for identification purposes;
    (e) wherein the transferred data in the memory is capable of being used with an application program.

48. A method for copying data from a connection table, comprising:
    (a) receiving a signal indicating that data is ready to be received by an application program;
    (b) identifying entries of a connection table in response to the signal;
    (c) determining whether the entries of the connection table are active, the entries of the connection table being active if the entries have been altered or just created since a previous transfer of data;
    (d) transferring data from active entries of the connection table to memory; and
    (e) allowing the transferred data in the memory to be used by the application program.

49. A computer program product stored in a computer readable medium for copying data from a connection table, comprising:
    (a) computer code for receiving a signal indicating that data is ready to be received by an application program;

(b) computer code for identifying entries of a connection table in response to the signal;
(c) computer code for determining whether the entries of the connection table are active, the entries of the connection table being active if the entries have been altered or just created since a previous transfer of data;
(d) computer code for transferring data from active entries of the connection table to memory; and
(e) computer code for allowing the transferred data in the memory to be used by the application program.

* * * * *